Feb. 9, 1937.　　　J. W. CARTER　　　2,070,154
CLUTCH
Filed Sept. 30, 1935　　　2 Sheets-Sheet 1

INVENTOR.
John W. Carter
BY
Van Buren Hillyard,
ATTORNEY.

Feb. 9, 1937.                J. W. CARTER                 2,070,154
                                CLUTCH
                          Filed Sept. 30, 1935            2 Sheets-Sheet 2
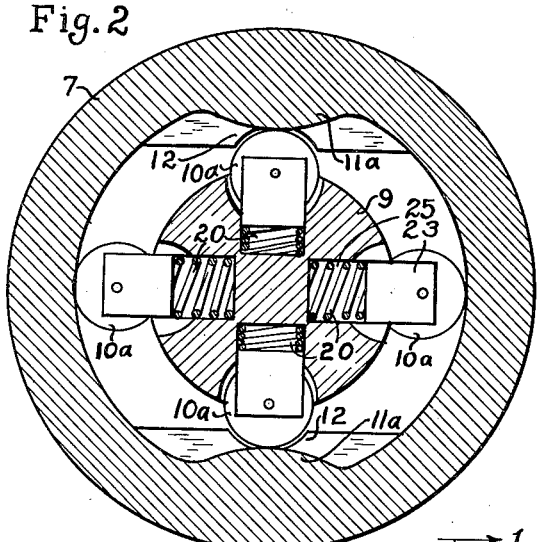
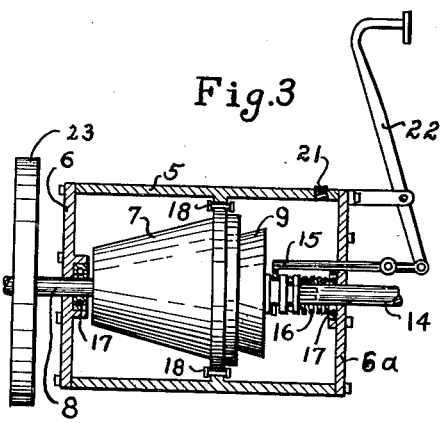
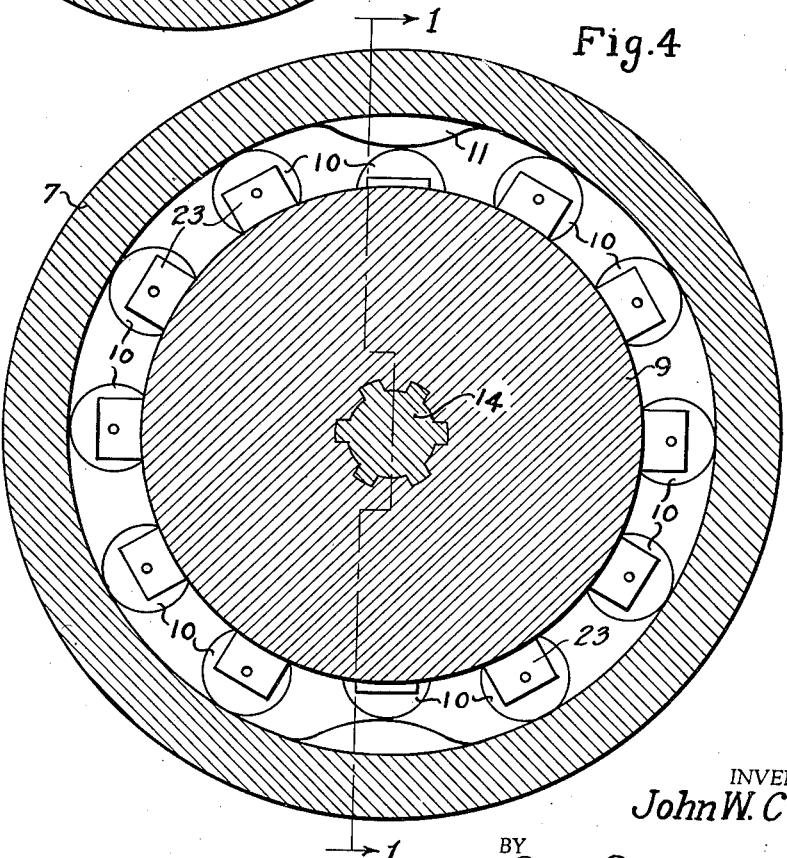
INVENTOR.
John W. Carter
BY Van Buren Hillyard.
ATTORNEY.

Patented Feb. 9, 1937

2,070,154

UNITED STATES PATENT OFFICE 2,070,154

CLUTCH

John W. Carter, Wichita Falls, Tex.

Application September 30, 1935, Serial No. 42,969

6 Claims. (Cl. 192—53)

The primary intent of the present invention is the provision of a clutch free from fabric or analogous frictional elements, which burn and wear rapidly, necessitating frequent and costly repairs.

The invention contemplates a clutch embodying two complemental coacting elongated concentric cone shaped members provided in their length with tapering cams and yieldable or spring pressed elements which constitute the frictional engaging means between said members when the clutch is functioning to transmit power from a drive to a driven shaft.

While the drawings illustrate a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which:

Figure 2 is a cross sectional view on the line 2—2 of Figure 1.

Figure 3 is a side view of the clutch on a reduced scale, the case being in section and the clutch members disengaged.

Figure 4 is a cross section on the line 4—4 of Figure 1.

Figure 1:
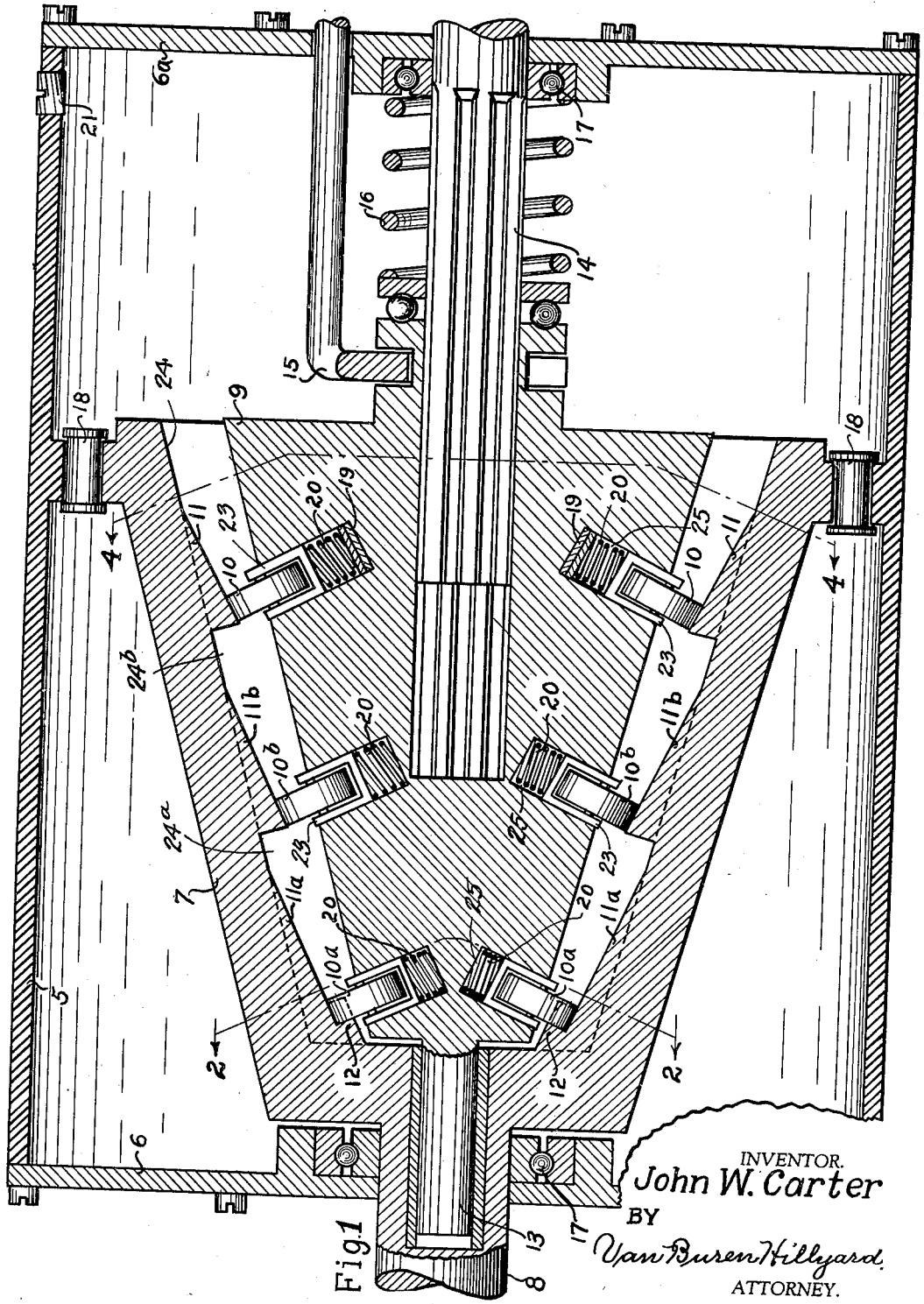
Figure 1 is a central, longitudinal sectional view of a clutch illustrating an embodiment of the invention, on the line 1—1 of Figure 4.

The numeral 5 designates a case housing the clutch and holding oil when desired. The clutch member 7 is connected with the drive shaft 8. The clutch member 9 is splined on the driven shaft 14 and is shiftable in any preferred manner by means of a pedal 22 and yoke connections 15. The usual clutch spring 16 is housed within the case 5. A centering pin 13, forming an extension of the member 9, engages the member 7 and drive shaft 8. The shafts 8 and 14 are mounted in the ends 6 and 6a of the case 5, friction being reduced by ball bearings 17. Anti-friction bearings 18 are interposed between the large end of the member 7 and the case 5.

The clutch members 7 and 9 are elongated cone shaped members having a concentric arrangement. Cams 11, 11a, and 11b are disposed upon the inner side of the member 7 at different points in its length and cooperate with yieldable elements 10, 10a and 10b to effect clutching engagement of the members 7 and 9. The cams taper in length and laterally from a medial longitudinal line, as shown most clearly in Figures 2 and 4. The cams vary in length and pitch to insure a gradual engagement of the clutch, essential to avoid jerk and insure smooth operation.

The yieldable elements consist of rollers mounted in frames 23 set in openings 25 formed in the member 9 and urged outwardly by springs 20. The yieldable elements are positioned to coact with the respective cams and are circumferentially spaced. Raceways 24, 24a and 24b are formed upon the inner wall of the member 7 to accommodate the yieldable elements 10, 10a and 10b, when the members of the clutch are disengaged. The springs 20 are compression and helical and their tension may be adjusted in any determinate manner, as by shims 19.

In practice, when the clutch is running free, as when disengaged, the several sets of yieldable elements travel in the respective raceways. When setting the clutch to connect the shafts 8 and 14, the initial movement of the member 9 brings the elements 10a in position to ride on the cams 11a. Continued movement of the member 9 positions the elements 10b to engage the cams 11b. As the member 9 continues its movement, the elements 10 are brought within the range of the cams 11 and ride thereon to further increase the engagement of the members. When the member 9 reaches the limit of its inward movement, the several elements 10, 10a and 10b are at the peak of the respective cams 11, 11a and 11b. At this stage, the resistance to independent movement of the parts 7 and 9 is such as to cause them and the drive and driven shafts to rotate in unison. To insure a positive and direct drive the member 7 is formed with an inner shoulder 12 recessed to receive the elements 10a. The inner shoulder 12 formed with recesses to receive the elements 10a constitutes, in effect, one member of a clutch. The elements 10a constitute the other member of the clutch. When the member 9 is at the limit of its movement within the member 7, the clutch is engaged by the elements 10a entering the recesses in the shoulder 12, as shown most clearly in Figure 1. This results in a direct positive drive.

It is to be noted that the clutch is free of fibrous fabric or like frictional material which is objectionable because of its liability to burn and rapid wear.

Having thus described the invention, what is claimed is:

1. A clutch comprising coacting members, spaced cams on one member, and yieldable elements on the other member to engage the cams and effect rotation of the two members, said cams and yieldable elements being disposed in longitudinally and circumferentially spaced relation and the cams varying in length and pitch to successively engage and remain in engaging position after contact.

2. A clutch comprising coacting members, spaced cams on one member, and yieldable elements on the other member to engage the cams and effect rotation of the two members, said cams and yieldable elements being disposed in longitudinally and circumferentially spaced relation and the cams varying in length and pitch and positioned to receive the yieldable elements upon their peaks when the clutch is fully engaged.

3. A clutch comprising complemental cone shaped members having a concentric arrangement, cams at intervals in the length and circumference of one of the members, and spaced yieldable elements in the length and circumference of the other member to coact with said cams.

4. A clutch comprising complemental cone shaped members having a concentric arrangement, cams at intervals in the length and circumference of one of the members, and spring pressed rollers in the length and circumference of the other member mating the respective cams and adapted to coact therewith.

5. A clutch comprising complemental cone shaped members having a concentric arrangement, cams at intervals in the length and circumference of one of the members, spaced yieldable elements in the length and circumference of the other member to coact with said cams, and positive inter-engaging elements to lock the members when the clutch is fully engaged.

6. A clutch embodying complemental cone shaped members disposed one within the other, the outer member having cams of varying lengths and pitch upon its inner side at intervals in its length and circumference, spring pressed rollers carried by the inner member and positioned to coact with the cams, and positive interlocking means between the members to secure them when the clutch is fully engaged.

JOHN W. CARTER.